Nov. 3, 1959  R. DORAND  2,911,151
DOUBLE-INTEGRATING UNIT
Filed June 30, 1954  4 Sheets-Sheet 1

Inventor
René Dorand
by Brown & Seward
Attorneys

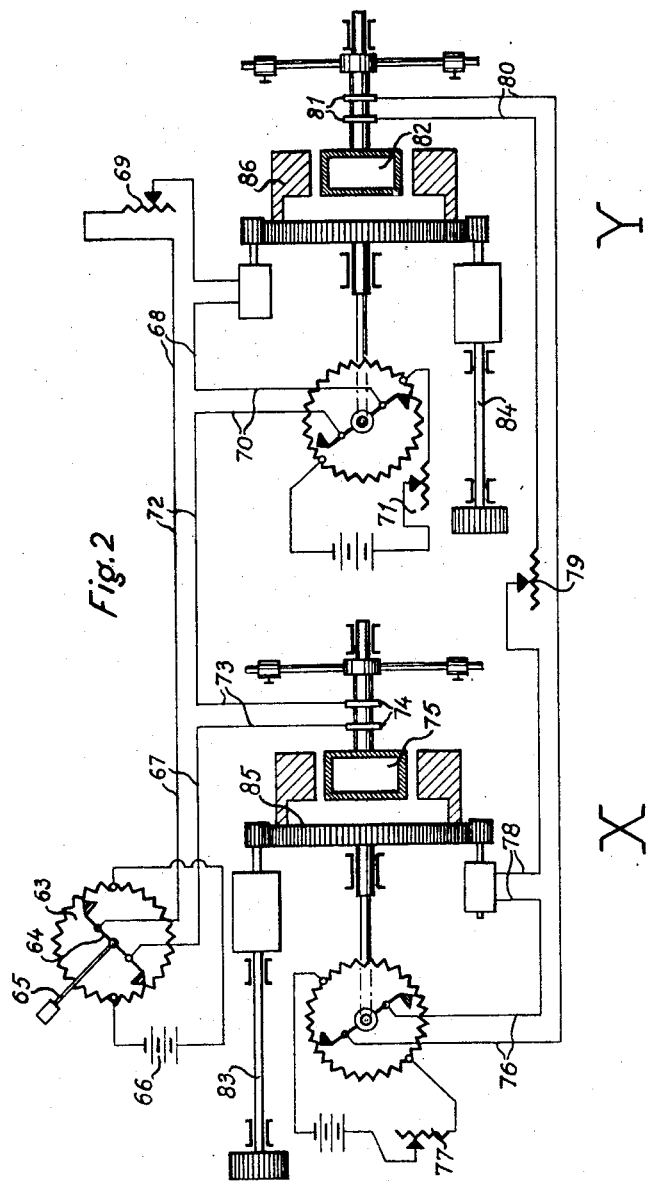

Nov. 3, 1959     R. DORAND     2,911,151
DOUBLE-INTEGRATING UNIT
Filed June 30, 1954     4 Sheets-Sheet 3
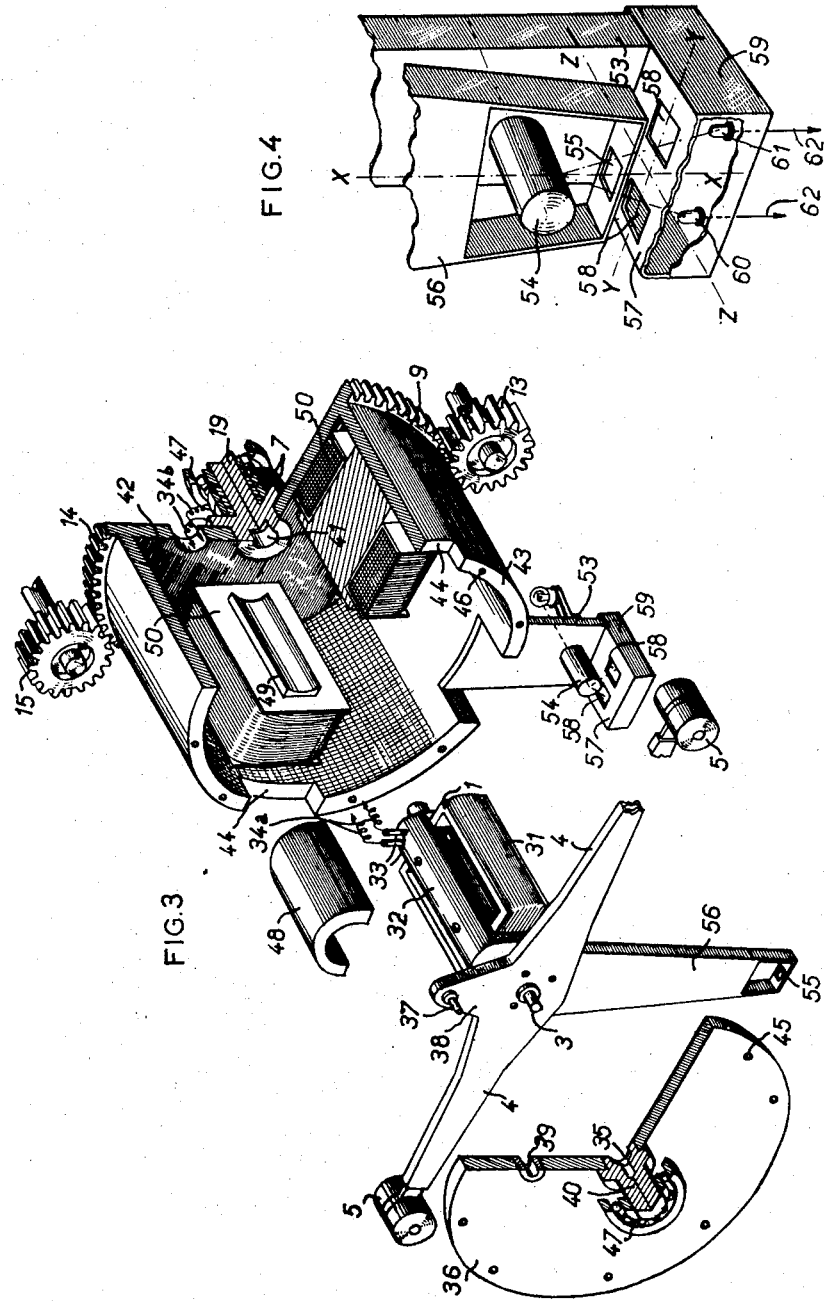
Inventor
René Dorand
by Brown & Seward
Attorneys Nov. 3, 1959   R. DORAND   2,911,151
DOUBLE-INTEGRATING UNIT
Filed June 30, 1954   4 Sheets-Sheet 4

Inventor
René Dorand
by Brown & Seward
Attorneys

United States Patent Office 2,911,151
Patented Nov. 3, 1959

2,911,151

DOUBLE-INTEGRATING UNIT

René Dorand, Paris, France, assignor to Giravions Dorand, Seine, France, a company of France Application June 30, 1954, Serial No. 440,384

7 Claims. (Cl. 235—183)

This invention relates to a double integrating unit, for a computer comprising a plurality of such units and adapted to solve a well-defined system of differential equations, as well as to a simulating apparatus for studying the behaviour of a movable engine, such as a projectile, an aerodyne, and so on, equipped with one or more computers of this type.

By suitably combining a number of double-integrating units according to the invention, it is possible to provide a computer for any system of differential corresponding to a physical phenomenon however complex. Similarly, by combining a plurality of such computers, it is possible to provide an apparatus for simulating the behaviour of any movable engine, however complex its displacements may be.

An object of the invention is to provide a purely electro-mechanical double integrating unit capable of giving at any time outputs proportional to the values of a variable and its first derivative, in response to an input voltage proportional to the second derivative of said variable.

Another object of the invention is to provide a computer comprising one or more double-integrating units of the type described, combined in such a manner that said computer gives, at any time, outputs proportional to the roots of a given system of differential equations, in response to inputs varying with the values of the terms of said system equations.

Still another object of the invention is to provide an apparatus for simulating the displacements of a movable engine, in response to the actuation of control means, such as a stick, a firing control and so on, comprising a plurality of computers of the type described above, so combined that the outputs of said computers correspond at any time to the displacements to be simulated in response to input voltages applied to the various computers and corresponding to the simulated action of one or more controls.

A more specific object of the invention is to provide a double integrating unit essentially comprising a flywheel freely journalled for unlimited angular displacement with the minimum possible friction whereby said displacement is at any time substantially equal to the double integral of the instantaneous acceleration of said fly-wheel and hence, of a force acting upon said fly-wheel to create said acceleration and whereby the angular velocity of said fly-wheel is the simple integral of said force or the first derivative of said displacement.

Another object of the invention is to provide a double-integrating unit of the type described, further comprising a second fly-wheel driven from the first one through a frictionless follow-up system provided with independent motor means, and means to read, record and/or transmit the angular displacements of said second fly-wheel, in response to a variable force acting upon said first one.

Still another object of the invention is to provide such a double integrating unit, wherein said first fly-wheel is formed as a galvanometer frame and wherein said second fly-wheel carries constant field electro-magnets cooperating with said frame, whereby said first and hence said second fly-wheels are imparted with angular displacements approximately proportional to the double integral of an input voltage fed into said galvanometer frame.

A still further object of the invention is to complete the above described arrangement by a tachometer generator rotated from said second fly-wheel through a positive drive, whereby the output voltage of said generator is proportional to the simple integral of the input voltage of the galvanometer, or, in other words, to the first derivative of the angular position of both fly-wheels, with respect to a predetermined origin.

With this arrangement and, in particular, due to the steadiness of the inducing field and the synchronisation of the rotations of both fly-wheels, if a voltage $e$ is fed into the galvanometer frame, there is induced in the winding of said frame a couple $M$ proportional to $e$.

$M = Ce$ where $C$ is a constant.

Still a further object of the invention is to provide the above mentioned galvanometer frame with a balancing lever or other inertia increasing means which may be adjustable e.g. to take into account constructive parameters of simulating apparatus controlled by the double integrating unit. In these conditions, the assembly comprising the galvanometer frame, its shaft and the inertia balancing lever, if any, may be considered as a pure mass having a well-defined inertia $I$.

Thus, if $x$ is an angular displacement of the galvanometer frame with respect to an arbitrarily chosen origin, under the action of voltage $e$, the following equations may be successively written:

$$x = \iint \frac{M}{I} dt dt$$

$$x = \iint \frac{Ce}{I} dt dt$$

$$x = \frac{C}{I} \iint e \, dt dt$$

It may be seen that $x$ is (neglecting $C/I$ which is a constant parameter of the galvanometer frame) the double integral of $e$. In other words, $e$ is proportional to the second derivative $\ddot{x}$ of $x$. Furthermore, the angular displacements of the second fly-wheel which are exactly the same as those of the first one are also proportional to the double integral of the input voltage, but said displacements are effected under the action of the motor means of the follow-up system, so that they may be used not only for reading purposes, but also for driving any utilization mechanism.

A still further object of the invention is to feed the above described galvanometer with an input voltage without giving rise to any friction capable of perturbating its massic characteristics, by equipping the second flywheel with a commutator and by interconnecting said galvanometer frame with said commutator through flexible conductors.

The follow-up system provided between the first and second fly-wheels may be of any suitable type. In particular, it is possible to use for this purpose a photocell follow-up system of the type described in the French Patent No. 1,050,962 of "Société dite: Servelec."

Similarly, the above-mentioned means to read, record or transmit the angular displacements of the second flywheel may be of any appropriate kind. However, it is a specific object of the invention to provide a double-integrating unit of the type described, wherein said second fly-wheel actuates directly or through a cam transducing a function of the angular displacement of said fly-wheel, the rotating arm of a potentiometer that will be called hereunder "dynamic potentiometer," the output of which varies in the same manner as a return torque or force, which would counteract the corresponding displacement of the fly-wheel.

Still another object of the invention is to control the outputs of said dynamic potentiometer and/or tachometer generator, by means of one or more setting potentiometers which, permits affecting the values of the relevant variable and/or its first derivative, respectively, with constant or variable coefficients e.g. to take into account constructive parameters of a utilization apparatus.

Another object of the invention is to provide a computer for solving a given system of differential equations comprising one double-integrating unit of the type described for each unknown variable of said system, said units being so interconnected that the angular displacement of the second fly-wheel of each of said units identify at any time the value of the relevant unknown variable simultaneously solving all equations of the system, while the output of the tachometer generator of said unit, if any, gives the value, at the same time, of the first derivative of said variable.

In a computer, as defined above, if the angular position of one of the galvanometer frames varies, for any reason, the whole assembly reacts immediately to solve the equation system so that said assembly is stable or unstable according to the nature of said system and reproduces, for example, in the last case, the behaviour of an inherently unstable movable engine.

A still further object of the invention is to incorporate in such a computer at least one rotating potentiometer e.g. manually controlled to vary according to a predetermined law one side of at least one equation of the system. The computer then gives the values of the various unknown variables, as well as their first derivatives resolving the equation system for each value of said function, thus imitating the behaviour of a movable engine stabilized or controlled e.g. by a piloting action.

A further specific object of the invention is to provide an apparatus for simulating the apparent displacement of a ground-to-ground guided missile, said apparatus being controlled by two double-integrating units, as described above.

Other objects and advantages of the present invention will be apparent from the following detailed description, together with the accompanying drawings, submitted for purpose of illustration only and not intended to define the scope of the invention, reference being had for that purpose to the subjoined claims.

In these drawings:

Fig. 2 is a similar view of a computer according to the invention, comprising two units of the type shown in Fig. 1.

Fig. 3 is an exploded view of the main elements of the unit shown in Fig. 1.

Fig. 4 is a part perspective enlarged view of the optical and photocell device of a follow-up system interposed between the two fly-wheels of the unit shown in Fig. 3.

Figure 1:
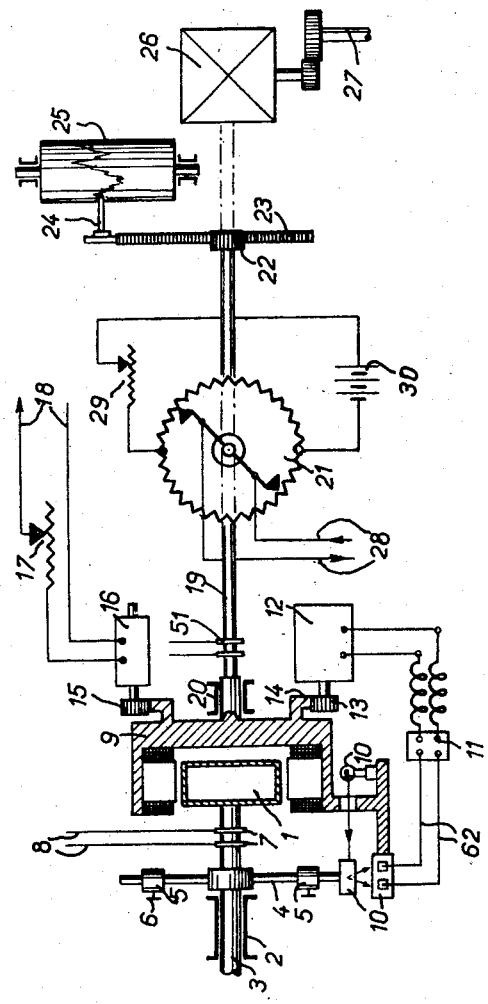
Fig. 1 is a schematic partially sectional view of a double-integrating unit according to the invention.

Referring first to Fig. 1, the double integrating unit according to the invention essentially comprises a fly-wheel 1 that, in the example shown, is formed as a galvanometer frame journalled on suitable bearing means 2 for free rotation with the minimum possible friction and for an unlimited angular stroke. On the shaft 3 of the frame 1 is keyed a balancing lever 4 right-angled with said shaft and provided with weights 5 adjustable by means of screws 6 permitting predetermination of the moment of inertia of the assembly which has just been described. The shaft 3 also carries a commutator 7 cooperating with fixed brushes connected with input conductors 8. As a matter of fact, the arrangement of said commutator that will be described in detail hereunder with reference to Fig. 3, is slightly different from that diagrammatically shown in Fig. 1 with a view to suppress any objectionable friction on the frame 1.

A second fly-wheel 9 surrounds, in the example shown, the galvanometer frame 1 and offers for the latter a suitable inducing field, as described hereunder. Between the frame 1 and the fly-wheel 9, is interposed a follow-up system comprising an optical and photo-cell device generally designated in Fig. 1 at 10 and described in detail hereunder, and an electronic follow-up block 11 that may be, for example, of the type described in the reference cited in the preamble, and a motor 12 that, in the example shown, is an electric one. The said motor is operatively connected with the follower fly-wheel 9 e.g. through a pinion 13 keyed on its output shaft and meshing with toothed annulus 14 fast with the fly-wheel 9. Said annulus 14 further meshes with another pinion 15 keyed on the input shaft of a tachometer generator 16. In the example shown, said potentiometer 17 is incorporated in the output circuit 18 of generator 16. The shaft 19 of the follower fly-wheel 9 is journalled, as shown in a bearing 20, also with the slightest possible friction. The shaft 19 is provided with motion pickup means to read, record or transmit the angular displacements of the fly-wheel 9. In the example shown, said means include a dynamic potentiometer 21, the rotating arm of which is driven from the shaft 19, a pinion 22 meshing with a rack 23 carrying an index 24 cooperating with a recording drum 25 rotated independently at a uniform speed and finally a motion pickup unit 26 of any suitable type, driving a shaft 27 which may transmit to any appropriate utilization apparatus or to another double-integrating unit of the same type the angular displacements of the fly-wheel 9. In the example shown, the output 28 of the dynamic potentiometer 21 is moreover controlled by a second setting potentiometer 29 interposed in the input circuit feeding said potentiometer 21 from a suitable source 30.

The general operation of the above-described double-integrating unit has been disclosed in the preamble. The further following points may be pointed out:

As already mentioned, the assembly comprising the frame 1 and the elements directly associated therewith may be considered as a substantially pure mass. Therefore, if a constant force, such as the input voltage $e$ is applied to said assembly, the same is imparted with a uniformly accelerated motion. The follower assembly including the fly-wheel 9 is thus imparted with a motion of the same nature. As a result, the angular displacement of said fly-wheel i.e. the double integral of its acceleration, represents the double integral of said constant force, and for example of the voltage $e$. Similarly, the angular velocity of said fly-wheel, i.e. the simple integral of the acceleration, represents the simple integral of said constant force of the first derivative of the angular displacement. Consequently, any angular displacement of the frame 1 and hence of the fly-wheel 9, will generate in the output circuit 18 of the tachometer generator 16 a voltage proportional to the first derivative of said displacement. In other words, the unit shown in Fig. 1 is capable of solving differential equations having a nil right side of the general form $ax + bx \cdot + cx \cdot \cdot = 0$, as well as differential equations having a constant or variable right side of the general form $ax + bx \cdot + cx \cdot \cdot = f(t)$ or $ax + bx \cdot + cx \cdot \cdot = k$.

The exploded view of Fig. 3 shows details of the construction of the main elements of the unit of Fig. 1. 1 is, as previously, the galvanometer frame, the winding of which is shown at 31. The core 32 of the frame 1 carries the terminals 33 of the winding 31, which terminals are interconnected through conductors 34a and 34b to the segments of the above mentioned commutator 7. This arrangement permits feeding the galvanometer frame without exerting thereupon any brush friction.

The shaft 3 proper of the frame 1 has a very small diameter; it carries directly the balancing lever 4 and its weights 5 and is engaged in a bore 35 of a removable flange of the fly-wheel 9 through the above mentioned bearing means 2 (not shown in Fig. 3). At its end far from the balancing lever 4, the shaft 3 is also journalled through reduced friction bearing means in a bore 41 provided in that end of the shaft 19 of the fly-wheel 9 which is engaged in the fixed flange 42 of said fly-wheel. In the example shown, the latter assumes the shape of a one-piece cylindrical member integral with the flange 42 and the annular edge 43 of which is provided with notches 44 through which are passed the arms of the balancing lever 4 to give the same a certain degree of freedom in its relative angular position, with respect to that of the fly-wheel 9. The above mentioned removable flange 36 is secured through suitable holes 45 in the annular edge 43, which is provided for this purpose with threaded bores 46. An outer axial embossing 40 of said flange and the shaft 19 are journalled on ball bearings 47 on either side of the assembly which has just been described. On the shaft 32 is mounted a soft iron core constituted by two semi-cylindrical members, one of which only is shown at 48. After assembling of the above described elements, the winding 31 of the frame 1 rotates with a gap as narrow as possible in front of the pole pieces 49 of two constant field electro-magnets 50. Said electro-magnets are fed from a commutator 51 (see Fig. 1). The flange 42 of the fly-wheel 9 carries a toothed annulus 14 meshing with the pinions 13 of the follow-up system motor 12 and the pinion 15 of the tachometer generator 16, as indicated with reference to Fig. 1.

The follow-up system which has been shown as illustrative is essentially constituted by a projecting lamp 52 mounted on a support 53 fast with the fly-wheel 9 and the light beam of which, after having been reflected by a mirror (not shown), contained in a tube 54, also carried by the support 53 passes through a gap 55 provided in the end of an arm 56 fast with the galvanometer frame 1. Said beam is then obturated practically across its whole section by a solid member 57 interposed between two gates 58 provided in the upper wall of a box 59 carried by the support 53 and containing two photocells 60 and 61, respectively.

The assembly described above is so designed that in the mean position shown in Fig. 4, both photocells are equally and slightly illuminated by the outermost rays of the beam passing through the gates 55 and 58.

However, as soon as the galvanometer frame tends to be shifted angularly with respect to the fly-wheel 9, the light beam passing through the gate 55 practically no more illuminates one of the cells (60 or 61 according to the direction of the relative displacement), while it now violently illuminates the other cell. The outputs of the photocells 60 and 61 are fed through conductors 62 to the input terminals of the electronic follow-up unit 11 to start motor 12 in such a way as to reset the fly-wheel 9 into its original relative position with respect to the galvanometer frame 1.

In Fig. 2 is shown a computer adapted to solve the following system of differential equations:

$$x \cdot\cdot = ay + by \cdot + f(t) \quad (1)$$
$$y \cdot\cdot = cx + ex \cdot \quad (2)$$

This computer comprises two units of the type shown in Fig. 1 generally designated by X and Y assigned to the unknown variables $x$ and $y$ of the system to be solved. The variations of $f(t)$ are obtained by means of a potentiometer 63, the rotating arm 64 of which is fast with a hand-control lever 65. Said potentiometer is fed from a source 66 of steady direct voltage. In these conditions, the voltage at 67 is proportional at any time to the value of $f(t)$; 68 designates another voltage proportional to $y \cdot$ (said voltage varying as described hereafter) affected with a coefficient by means of a setting potentiometer 69 and that is combined with a third voltage 70 proportional to $y$ (that varies also in a manner described hereunder) affected with a coefficient $a$ by means of a setting potentiometer 71. The resultant 72 of the voltages 68 and 70 is combined with the output 67 of the potentiometer 63, which output corresponds to the value of $f(t)$ and the sum of the three voltages 70, 68 and 77 corresponding to $ay + by \cdot = f(t)$, or $x \cdot \cdot$ according to the Equation 1 of the system, is fed through load-in conductors 73 to the commutator 74 of the galvanometer frame 75 of the double integrating unit X. As already mentioned, with reference to Figure 1 and as disclosed in the preamble, the said double-integrating unit X gives at 76, through a setting potentiometer 77, an output proportional to $x$ and equal to $cx$, $c$ being a coefficient determined by the adjustment of the said potentiometer 77. The same unit X gives at 78, through another setting potentiometer 79, a second output proportional to $x \cdot$ and equal to $ex \cdot$, $e$ being a coefficient determined by the adjustment of the said potentiometer 79. The resultant of both last mentioned voltages (which resultant is proportional to $cx + cx \cdot$ or to $y \cdot \cdot$ according to the Equation 2, is fed through lead-in conductors 80 to the commutator 81 of the galvanometer frame 82 of the second double integrating unit Y. The latter generates in turn the previously mentioned outputs 70 and 68 which are proportional to $ay$ and $by \cdot$ respectively, and so on. A continuous interaction thus takes place between both double integrating units which ensures at any time the simultaneous resolution of Equations 1 and 2 of the system.

Two motion pick-up members 83 and 84 illustrate means for transmitting to any desired apparatus the angular displacements of the follower fly-wheels 85 and 86 respectively of the units X and Y, respectively of the computer. In other words, mechanical parts may be displaced at any time as a function of the roots $x$ and $y$ of the system of Equations 1 and 2 for the relevant value of $f(t)$. On the other hand, it is obvious that if the control lever 65 is held stationary, the output 67 of the potentiometer 63 may be given a constant and in particular, a nil value. In these conditions, if, for any reason, one or more of the computer elements happen to be displaced, the computer reacts immediately to vary all other terms in such a manner that the equations of the system both remain true. This facility permits using the computer for studying the natural motions of a movable engine in response to any parameters; in particular if said movable engine is inherently unstable, as in the case when the computer is used for simulating the conditions of flight of a helicopter and still more particularly in hovering flight. As previously mentioned, by combining a certain number of computers such as that of Fig. 2, or merely a plurality of double integrating units such as that of Fig. 1, it is possible to design apparatus for simulating any kind of movable engine however complex its displacements.

Figure 5:
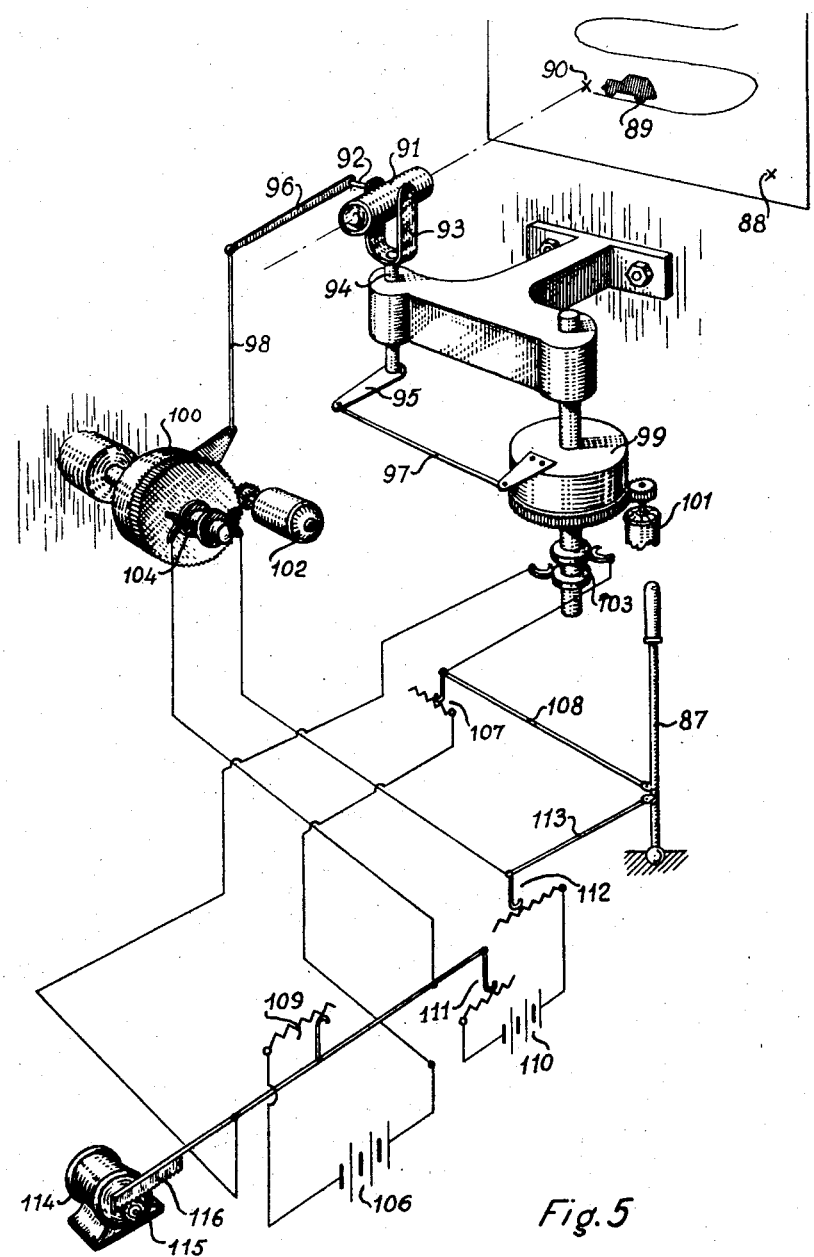
Fig. 5 is a schematic perspective view of an apparatus for simulating the apparent displacement of a ground-to-ground guided missile, controlled by two units of the type shown in Fig. 1.

In Fig. 5, is schematically shown as a mere illustration two double integrating units of the type of Fig. 1 used for controlling a simulating apparatus for imitating the behaviour of a ground-to-ground missile guided towards a movable target. In the example shown in Fig. 5, it has been assumed that the control of the simulating apparatus is effected by means of a stick 87; it is obvious, however, that said stick could be substituted for by any other control means and e.g. by an electric remote control system sending square pulses capable of simulating accelerations in two right-angled directions.

The principle of this simulating apparatus consists in projecting on a screen 88 a film reproducing the apparent displacements of a target 89 within a stationary background.

On the same screen 88 is further projected a spot 90 which is supposed to represent e.g. the visible flame of a ground-to-ground guided missile. The projector 91 of the spot 90 is mounted for a swivel motion e.g. around a first horizontal axis 92 carried by a yoke 93 pivoted in turn around a vertical axis 94. The orientation of the projector 91 is ensured in azimuth by a crank arm 95 keyed on the axis 94 and in elevation by another crank arm 96 keyed on the axis 92. The crank arms 95 and 96 are controlled through connecting rods 97 and 98 from the follower fly-wheels 99 and 100, respectively, of two double integrating units of the type shown in Fig. 1. There are shown at 101 and 102, respectively the motors of the follow-up systems of said units and at 103 and 104, respectively, the input commutators of their galvanometer frames.

The commutator 103 is fed from a source 106 through a control potentiometer 107, the movable contact of which is connected by means of a linkage 108 with the stick 87, and through a range potentiometer 109, the function of which will be described hereunder. Similarly, the input commutator 104 of the other double-integrating unit is fed from a source 110 through a range potentiometer 111 and a control potentiometer 112 linked through a connecting rod 113 to the stick 87. When learning to guide the ground-to-ground missile, the apparent displacements of which is simulated by those of a spot 90, the operator must try to bring said spot into coincidence with the projected image 89 of the target and to maintain this coincidence until the projection of said target is stopped under the control of means (not shown), the design of which will be easily imagined by those skilled in the art, at a time corresponding to that at which an actual guided missile would be at the same distance from the operator as the target; further means (not shown) are also provided to stop the projection of the spot at the same time, so that if the operator has made a good shot the spot remains coincident with the image of the target, while if he has missed the target, the spot and the target image remain separated on the screen, as long as necessary for examining and criticizing the firing.

It will be easily understood that, since the spot moves on a screen, i.e. in a system comprising only two co-ordinate axes, it is necessary to provide means for correcting said displacements as a function of the progressively increasing distance of the guided missile from the operator in an actual firing. Said means are essentially constituted, in the example shown, by a motor 114 driving a pinion 115 that meshes with a rack 116 fast with the movable contacts of the range potentiometers 109 and 111. Motor 114 which is continuously rotated with a number of turns that is a function of the speed of the projectile, this determines a progressive drop of the voltages injected into both double-integrating units under the control of the stick 87 and which are supposed to represent the accelerations which would be imparted to the guided missile by the operator in an actual firing. If the speed of the motor 114, as well as the design of the whole assembly, is suitably chosen, it is easy to obtain that the linear displacements of the spot 90, which are substantially proportional to its angular displacements due to the fixed distance between the screen and the projecting apparatus, correspond at each moment to the real angular displacements which could be observed by the operator in an actual firing, which real angular displacements are smaller and smaller for the same real linear displacement, as the distance of the guided missile increases.

It is to be understood that the invention is in no way limited to the examples described and shown and that it may be affected with numerous modifications within the reach of those skilled in the art without departing from the spirit of the invention.

In particular, in the above detailed description of the double-integrating unit, a balancing lever fast with the galvanometer frame has been provided. In certain cases, when a very small inertia of said frame is acceptable, said balancing lever may be completely suppressed. The tachometer generators may be replaced by any other suitable speedometers such as spring controlled masses responsive to centrifugal force, mounted on the follower fly-wheel and actuating a potentiometer.

Moreover, the coefficients of the unknown variables of the equation system to be solved have been assumed hereabove to be constant. It is obvious that it is also possible to use coefficients identifying functions e.g. of time or of one or more variables of the system so that, finally, it will be always possible to design a computing machine capable of solving a system of differential equations of the following general type:

$$u\cdot\cdot = f_1(u, v \ldots z) + f_2(u\cdot, v\cdot \ldots z\cdot) + f_3(t)$$
$$v\cdot\cdot = g_1(u, v \ldots z) + g_2(u\cdot, v\cdot \ldots z\cdot) + g_3(t)$$
$$\ldots\ldots\ldots\ldots\ldots\ldots\ldots\ldots\ldots\ldots\ldots\ldots$$
$$z\cdot\cdot = l_1(u, v, \ldots z) + l_2(u\cdot, v\cdot \ldots z\cdot) + l_3(t)$$

the terms $f_1, f_2, f_3 \ldots l_1, l_2, l_3$ each representing any function of the unknown variables $u, v, \ldots z$, of the system or of time $t$.

Moreover, by grouping several computers in series, the order of the differential equations may be elevated.

It is also possible to introduce in to the system terms of the form: $f(u\cdot\cdot, v\cdot\cdot \ldots z\cdot\cdot)$ since the acceleration of the follower fly-wheel may be measured electrically by means of an accelerometer the latter being constituted, for example, by a spring-controlled mass.

Other terms of the type: $f(\int u dt, \int v dt \ldots \int z dt)$, may be also introduced. In this case, the integration may be for example, effected by means of a mechanical integrator controlled by the follower fly-wheel and actuating a potentiometer. Furthermore, the follower fly-wheel may be also adapted to control devices for ensuring a change of co-ordinates.

What is claimed is:

1. A double-integrating unit comprising a fixed support, a first fly-wheel, anti-friction bearing means to freely journal said first fly-wheel for unlimited angular displacement on said support, a second fly-wheel rotatively mounted on said support, a follow-up system including motor means to rotate said second fly-wheel in step with said first one without exerting any mechanical stress on the latter and means supported on said second fly-wheel to apply a rotating torque to said first fly-wheel to impart the same with an acceleration, whereby the resulting angular displacement of said second fly-wheel is substantially proportional to the double integral of said rotating torque.

2. A double integrating unit comprising a fixed support, a galvanometer frame, anti-friction bearing means to journal said frame for unlimited angular displacements on said support, a fly-wheel rotatively mounted on said support, an electro-magnetic system with constant field characteristics, fixedly secured on said fly-wheel with its pole structure in the near vicinity of said galvanometer frame, a follow-up system including motor means to rotate said fly-wheel in step with said galvanometer frame without exerting any mechanical stress on the latter, means to feed said electromagnetic system with a constant current and means supported on said fly-wheel to feed said galvanometer frame with an input voltage without exerting any substantial frictional stress thereon, to impart said frame with an acceleration, whereby the resulting angular displacement of said second fly-wheel with respect to a predetermined origin is substantially proportional to the double integral of said input voltage.

3. A double integrating unit according to claim 2, further comprising a tachometer generator driven from said fly-wheel to detect the speed of said angular displacement, whereby the output voltage of said generator is substantially proportional to the simple integral of said input voltage.

4. A double-integrating unit according to claim 2, further comprising a dynamic potentiometer incorporated in a circuit fed from a source of constant current and the rotating arm of which is driven from said fly-wheel, whereby the output voltage of said potentiometer is substantially proportional to the double integral of said galvanometer frame input voltage.

5. A double integrating unit comprising in combination a fixed support, a galvanometer frame, anti-friction bearing means to journal said frame for unlimited angular displacement on said support, a fly-wheel rotatively mounted on said support, an electro-magnetic system with constant field characteristics, fixedly secured on said fly-wheel with its pole structure in the near vicinity of said galvanometer frame, a follow-up system including motor means to rotate said fly-wheel in step with said galvanometer frame without exerting any mechanical stress on the latter, first commutator means on said fly-wheel interconnected with the winding of said electro-magnetic system, to feed electromagnetic system with a constant current and second commutator means including brush means supported on said fly-wheel and flexible connections to feed said galvanometer frame with an input voltage from said brush means without exerting any frictional stress thereon, to impart said frame with an acceleration, a tachometer generator driven from said fly-wheel, whereby the voltage in the output circuit of said generator is substantially proportional to the first integral of said input voltage and a dynamic potentiometer fed from a source of constant current and having its rotating arm driven from said fly-wheel whereby the voltage in the output circuit of said potentiometer is substantially proportional to the double integral of said input voltage.

6. An apparatus for simulating the displacements of a movable body, comprising, in combination, a calculating machine including at least one computer comprising a plurality of double-integrating units according to claim 5, wherein at least one of the outputs of at least one of said units is used as an input voltage for at least one of the other units, means to imitate the structure of said body, a follow-up system to impart said means with angular displacements in response to those of the fly-wheel of at least one of the double integrating units of said calculating machine and a control device to vary the input voltage of the galvanometer frame of one of said units according to a law simulating the law of variation of the accelerations which would be imparted to said movable body by the actual control simulated by said control device.

7. An apparatus for simulating the displacements of a movable body, comprising, in combination, a calculating machine including at least one double-integrating unit according to claim 5, means to imitate the structure of said body, a follow-up system to impart said means with angular displacements in response to those of the fly-wheel of at least one of the double integrating units of said calculating machine and a control device to vary the input voltage of the galvanometer frame of one of said units according to a law simulating the law of variation of the accelerations which would be imparted to said movable body by the actual control simulated by said control device.

References Cited in the file of this patent

UNITED STATES PATENTS

| | | |
|---|---|---|
| 1,894,449 | Sandvoss | Jan 17, 1933 |
| 2,444,329 | Booth | June 29, 1948 |
| 2,511,614 | Agins et al. | June 13, 1950 |
| 2,662,305 | Alric | Dec. 15, 1953 |
| 2,687,580 | Dehmel | Aug. 31, 1954 |
| 2,689,684 | Laternser | Sept. 21, 1954 |

FOREIGN PATENTS

| | | |
|---|---|---|
| 473,847 | Canada | May 22, 1951 |